United States Patent [19]

Salomon et al.

[11] Patent Number: 4,560,630

[45] Date of Patent: Dec. 24, 1985

[54] RECHARGEABLE LITHIUM CELL HAVING AN ELECTROLYTE COMPRISING 4-BUTYROLACTONE IN DIMETHOXYETHANE

[75] Inventors: Mark Salomon, Fairhaven; Edward J. Plichta, Freehold, both of N.J.

[73] Assignee: The United States of America as represented by the Secretary of the Army, Washington, D.C.

[21] Appl. No.: 655,114

[22] Filed: Sep. 27, 1984

[51] Int. Cl.[4] ............................................. H01M 6/14
[52] U.S. Cl. ..................................... 429/194; 429/196; 429/197; 429/218
[58] Field of Search ............... 429/194, 196, 197, 218, 429/232

[56] References Cited

U.S. PATENT DOCUMENTS

| | | | |
|---|---|---|---|
| 3,658,592 | 4/1972 | Dey | 429/197 |
| 3,681,144 | 8/1972 | Dey et al. | 429/197 |
| 3,923,543 | 12/1975 | Auborn et al. | 429/196 |
| 4,201,839 | 5/1980 | Johnson et al. | 429/194 |
| 4,233,375 | 11/1980 | Whittingham et al. | 429/194 |
| 4,284,692 | 8/1981 | Rao et al. | 429/197 X |
| 4,385,103 | 5/1983 | Louzos et al. | 429/197 |
| 4,416,960 | 11/1983 | Eustace et al. | 429/197 X |

Primary Examiner—Anthony Skapars
Attorney, Agent, or Firm—Anthony T. Lane; Jeremiah G. Murray; Roy E. Gordon

[57] ABSTRACT

A rechargeable lithium cell is provided comprising a lithium anode, a lithium intercalating cathode, and an electrolyte comprising a solution of a lithium salt such as $LiAsF_6$ or $LiAlCl_4$ in 24.4 mass percent 4-butyrolactone (4-BL) in dimethoxyethane (DME). The cell exhibits improved low temperature ($-40°$ C.$\leq t \leq 0°$ C.) performance and rate capability.

8 Claims, 2 Drawing Figures

RECHARGEABLE LITHIUM CELL HAVING AN ELECTROLYTE COMPRISING 4-BUTYROLACTONE IN DIMETHOXYETHANE

The invention described herein may be manufactured, used and licensed by or for the Government for Governmental purposes without the payment to us of any royalty thereon.

This invention relates in general to lithium cells and in particular, to a rechargeable lithium cell that exhibits improved low temperature ($-40°$ C.$\leq t \leq 0°$ C.) performance and rate capability.

BACKGROUND OF THE INVENTION

Heretofore, lithium rechargeable cells utilizing a lithium anode, employed a solution of a lithium salt such as $LiAsF_6$ in pure organic solvents or mixed organic solvents such as a mixture of 2 methyl tetrahydrofuran and tetrahydrofuran as the electrolyte and a lithium intercalating cathode. The difficulty with these cells were their poor low temperature behavior and their low rate capability.

SUMMARY OF THE INVENTION

The general object of this invention is to provide an improved rechargeable lithium cell. A more specific object of the invention is to provide a rechargeable lithium cell having an improved low temperature ($-40°$ C.$\leq t \leq 0°$ C.) performance and rate capability.

It has now been found that the aformentioned objects can be attained using lithium as the anode, a solution of a lithium salt such as $LiF_6$ or $LiAlCl_4$ in a mixed organic solvent as the electrolyte and a lithium intercalating cathode. More specifically, the electrolyte according to the invention includes 0.8 to 1.0M $LiAsF_6$ in 24.4 mass percent 4-butyrolactone (4-BL) in dimethoxyethane (DME). The lithium intercalating cathode according to the invention can be a $TiS_2$ cathode including 83 weight percent $TiS_2$, 8.5 weight percent polytetrafluoroethylene and 8.5 weight percent carbon or a mixed cathode including 60 weight percent $MoS_3$, 20 weight percent $TiS_2$, 10 weight percent polytetrafluoroethylene, and 10 weight percent carbon.

The use in the electrolyte of 4-BL which has a moderately high dielectric constant of 41 Debyes promotes increased solubilities in mixtures with DME, and allows the use of much lower $LiAsF_6$ or $LiAlCl_4$ concentrations. The use of lower electrolyte concentrations prevents the precipitation of the salt as the temperature is decreased. At the same time, the use of 4-BL mixtures with DME lead to electrolytic conductivities that are much higher than for either of the pure ether or other mixed ether solutions. Although 24.4 mass percent 4-BL in DME was chosen as the optimized solvent mixture, an operating range of 15 to 50 mass percent 4-BL in DME can also be used.

Moreover, the electrolytic conductivities of 24.4 mass percent BL in DME as a function of temperature for $LiAlCl_4$ and $LiAsF_6$ are significantly higher at low temperatures ($-50°$ C.$\leq t \leq 0°$ C.) than other pure or mixed solvent electrolyte systems.

DESCRIPTION OF THE DRAWING

Referring to FIG. 1, it can be seen that the mixed $MoS_3$-$TiS_2$ cathode appears to operate well down to $-30°$ C. at 2 $mA/cm^{-2}$. The number of equivalents of lithium intercalated at $-10°$ C., $-20°$ C. and $-30°$ C. are 1.70, 1.13, and 0.81, respectively. At this moderate current density of 2 $mA/cm^{-2}$ the mixed $MoS_3$-$TiS_2$ cathode behaves similar to that of pure $TiS_2$.

Referring to FIG. 2, the number of lithium equivalents intercalated per mole of $TiS_2$ are 0.77, 0.66, 0.53, 0.33, 0.12, at $0°$ C., $-10°$ C., $-20°$ C., $-30°$ C. and $-40°$ C., respectively.

Figure 1:
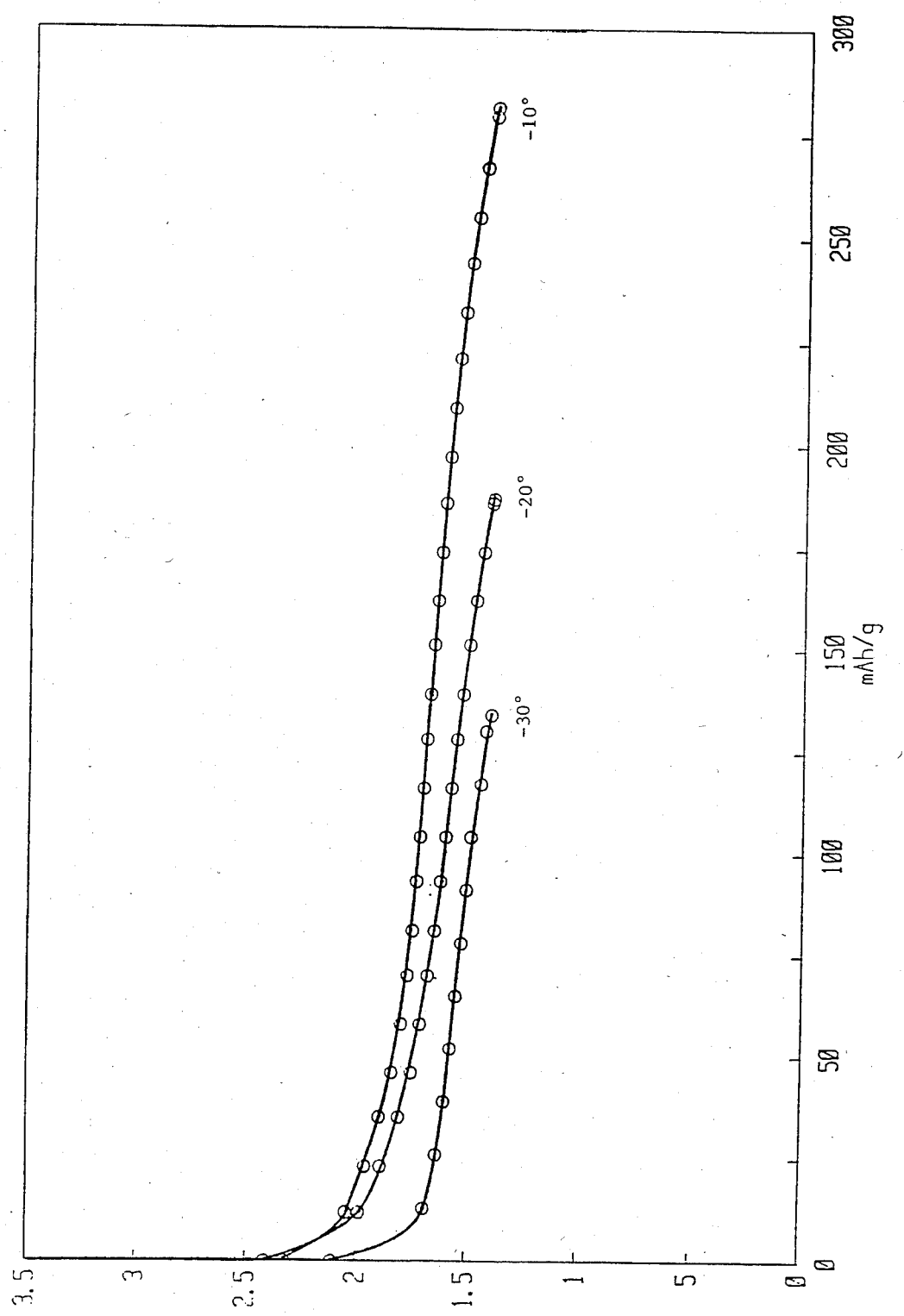
FIG. 1 shows the discharge of the $Li/MoS_3$-$TiS_2$ cell at 2 $mA/cm^2$ in 0.8M $LiAlCl_4$.
Figure 2:
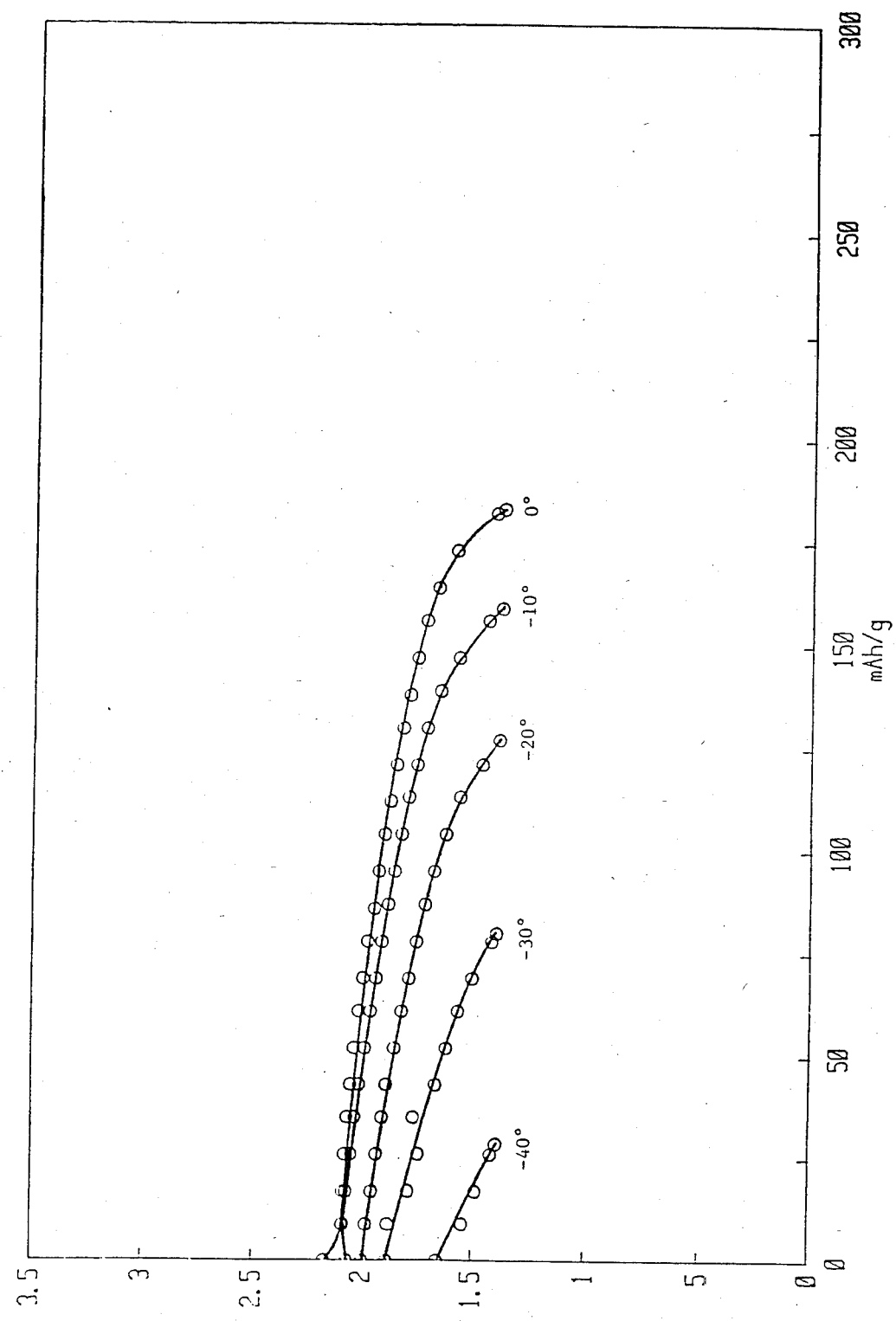
FIG. 2 shows the discharge of the $Li/TiS_2$ cell at 2 $mA/cm^2$ in 0.8M $LiAlCl_4$.

At 5 $mA/cm^{-2}$ at $-30°$ C. both $Li/TiS_2$ and $Li/MoS_3$-$TiS_2$ cells have negligible capacity: in both cases about 0.07 equivalents of lithium are intercalated.

We wish it to be understood that we do not desire to be limited to the exact details as described for obvious modifications will occur to a person skilled in the art.

What is claimed is:

1. A rechargeable lithium cell having an improved low temperature ($-40°$ C.$\leq t \leq 0°$ C.) performance and rate capability comprising a lithium anode, a lithium intercalating cathode, and an electrolyte comprising a solution of a lithium salt in 15 to 50 mass percent 4-butyrolactone (4-BL) in dimethoxyethane (DME).

2. A rechargeable lithium cell according to claim 1 wherein the lithium intercalating cathode is selected from the group consisting of 83 percent $TiS_2$, 8.5 percent polytetrafluoroethylene, 8.5 percent carbon and 60 percent $MoS_3$, 20 percent $TiS_2$, 10 percent polytetrafluoroethylene, 10 percent carbon.

3. A rechargeable lithium cell according to claim 2 wherein the lithium intercalating cathode consists of 83 percent $TiS_2$, 8.5 percent polytetrafluoroethylene, 8.5 percent carbon.

4. A rechargeable lithium cell according to claim 2 wherein the lithium intercalating cathode consists of 60 percent $MoS_3$, 20 percent $TiS_2$, 10 percent polytetrafluoroethylene, 10 percent carbon.

5. A rechargeable lithium cell according to claim 1 wherein the lithium salt is 0.8 to 1.0 molar $LiAsF_6$.

6. A rechargeable lithium cell according to claim 1 wherein the lithium salt is 0.8 to 1.0 molar $LiAlCl_4$.

7. A rechargeable lithium cell having an improved low temperature ($-40°$ C.$\leq t \leq 0°$ C.) performance and rate capability comprising a lithium anode, a lithium intercalating cathode consisting of 83 percent $TiS_{22}$, 8.5 percent polytetrafluoroethylene and 8.5 percent carbon and an electrolyte comprising an 0.8 to 1.0 molar solution of $LiAlCl_4$ in 24.4 mass percent 4-butyrolactone in dimethoxyethane.

8. A rechargeable lithium cell having an improved low temperature ($-40°$ C.$\leq t \leq 0°$ C.) performance and rate capability comprising a lithium anode, a lithium intercalating cathode consisting of 60 percent $MoS_3$, 20 percent $TiS_2$, 10 percent polytetrafluoroethylene and 10 percent carbon and an electrolyte comprising an 0.8 to 1.0 molar solution of $LiAlCl_4$ in 24.4 mass percent 4-butyrolactone in dimethoxyethane.

* * * * *